United States Patent
Giazotto (12) United States Patent (10) Patent No.: US 7,578,199 B2
Giazotto (45) Date of Patent: Aug. 25, 2009

(54) APPARATUS AND METHOD SUITABLE FOR MEASURING THE DISPLACEMENT OR LOAD ON AN AIRCRAFT COMPONENT

(75) Inventor: Alessandro Riccardo Britannico Giazotto, Bristol (GB)

(73) Assignee: Airbus UK Limited, Bristol (GB)

( * ) Notice: Subject to any disclaimer, the term of this patent is extended or adjusted under 35 U.S.C. 154(b) by 182 days.

(21) Appl. No.: 10/569,699

(22) PCT Filed: Aug. 26, 2004

(86) PCT No.: PCT/GB2004/003656

§ 371 (c)(1),
(2), (4) Date: Feb. 24, 2006

(87) PCT Pub. No.: WO2005/022098

PCT Pub. Date: Mar. 10, 2005

(65) Prior Publication Data

US 2007/0006662 A1    Jan. 11, 2007

(30) Foreign Application Priority Data

Aug. 27, 2003   (GB) .................................. 0320079.7
Dec. 12, 2003   (GB) .................................. 0328872.7

(51) Int. Cl.
*G01L 1/24* (2006.01)
(52) U.S. Cl. ....................................................... 73/800
(58) Field of Classification Search .................... 73/800
See application file for complete search history.

(56) References Cited

U.S. PATENT DOCUMENTS 3,557,977 A * 1/1971 Atwater et al. ............... 414/282

(Continued)

FOREIGN PATENT DOCUMENTS

DE           40 35 197 A1      1/1992

(Continued)

OTHER PUBLICATIONS

Blaha, et al., "Avionic Fiber Optic Sensor Systems," *Proc. 1st int. workshop on photonic networks, components and applications*, (pp. 142-150) (1990).

*Primary Examiner*—Lisa M Caputo
*Assistant Examiner*—Octavia Davis
(74) *Attorney, Agent, or Firm*—Patterson, Thuente, Skaar & Christensen, P.A.

(57) ABSTRACT

The load on an aircraft component, such as the load on a landing gear leg during braking, is measured with a contactless, all-weather displacement measuring system. The system includes a control unit a controllable microwave emitter of electromagnetic radiation and a microwave detector comprising a plurality of antennae. When the aircraft component is subjected to a load relative movement of the emitter and detector is caused. The detector generates in response to microwave radiation received from the focused beam of radiation emitted by the emitter a signal that is received by a signal processor of the control unit. The signal received by the control unit depends on the relative positions of the emitter and detector. The control unit is arranged to provide an output signal representative of the load sustained by the aircraft component. The system may be used to control braking in dependence on the output signal so as to maximize braking efficiency without overloading the landing gear leg.

23 Claims, 5 Drawing Sheets

U.S. PATENT DOCUMENTS

| | | | |
|---|---|---|---|
| 3,900,828 A | | 8/1975 | Lage et al. |
| 4,286,839 A | * | 9/1981 | Ilzig et al. .................... 362/552 |
| 4,304,492 A | * | 12/1981 | Fox ............................ 356/439 |
| 4,312,580 A | * | 1/1982 | Schwomma et al. .......... 396/26 |
| 4,409,842 A | | 10/1983 | Scott et al. |
| 4,426,875 A | | 1/1984 | Crosby, Jr. |
| 4,459,477 A | * | 7/1984 | Asawa et al. ........... 250/227.16 |
| 4,480,480 A | * | 11/1984 | Scott et al. ..................... 73/769 |
| 4,684,929 A | | 8/1987 | Edwards et al. |
| 4,900,920 A | | 2/1990 | Federmann et al. |
| 4,930,852 A | * | 6/1990 | Wheeler et al. ............. 359/315 |
| 4,962,669 A | | 10/1990 | Gernhart et al. |
| 5,044,205 A | | 9/1991 | Wolff et al. |
| 5,167,385 A | | 12/1992 | Häfner |
| 5,170,366 A | * | 12/1992 | Passarelli ..................... 702/41 |
| 5,182,449 A | * | 1/1993 | Johnson et al. ........ 250/227.14 |
| 5,253,531 A | * | 10/1993 | Walker et al. ................. 73/650 |
| 5,381,005 A | | 1/1995 | Chazelas et al. |
| 5,397,891 A | | 3/1995 | Udd et al. |
| 5,484,121 A | * | 1/1996 | Padawer et al. .......... 244/134 F |
| 5,606,137 A | | 2/1997 | Penketh |
| 5,646,401 A | | 7/1997 | Udd |
| 5,656,783 A | | 8/1997 | Frisch et al. |
| 6,032,090 A | * | 2/2000 | von Bose ...................... 701/37 |
| 6,293,141 B1 | * | 9/2001 | Nance ...................... 73/178 T |
| 6,466,643 B1 | * | 10/2002 | Bueno et al. ................... 378/58 |
| 6,566,648 B1 | | 5/2003 | Froggatt |
| 6,637,266 B1 | * | 10/2003 | Froom ......................... 73/583 |
| 6,817,246 B1 | | 11/2004 | Rottner et al. |
| 7,142,299 B2 | * | 11/2006 | Tokhtuev et al. ............ 356/338 |
| 2007/0032919 A1 | * | 2/2007 | Giazotto ........................ 701/3 |

FOREIGN PATENT DOCUMENTS

| | | |
|---|---|---|
| DE | 42 40 600 C1 | 6/1994 |
| DE | 43 16 043 A1 | 11/1994 |
| DE | 43 16 044 A1 | 11/1994 |
| EP | 0 066 923 A2 | 12/1982 |
| FR | 2 520 870 | 8/1983 |
| FR | 2 578 974 | 9/1986 |
| FR | 2 828 278 | 2/2003 |
| WO | WO 81/03698 | 12/1981 |
| WO | WO 01/18487 A1 | 3/2001 |

* cited by examiner

APPARATUS AND METHOD SUITABLE FOR MEASURING THE DISPLACEMENT OR LOAD ON AN AIRCRAFT COMPONENT

BACKGROUND OF THE INVENTION

The present invention relates to an aircraft including an apparatus for measuring the load sustained by an aircraft component and to a method of measuring such a load. In particular, the present invention relates to an apparatus for determining the load sustained by an aircraft when braking and/or maneuvering the aircraft on the ground.

When an aircraft maneuvers on the ground (including, for example, immediately after touch down), the aircraft is subjected to various loads including vertical wheel to ground loads and horizontal drag loads including, for example, loads caused by friction between the tires of the wheels of the aircraft and the ground. The landing gear is subjected to significant horizontal loads on braking. The landing gear and other components of the aircraft have to be carefully designed in order for the aircraft to be able to withstand such loads, and other operational loads, but without unduly increasing the mass of the aircraft.

By using a load measuring device as part of a feedback braking system it is possible to limit, at least in part, the maximum load sustained by the airframe, landing gear, or a part thereof and/or to facilitate efficient braking of the wheels. It may also be advantageous to use load measuring devices during the testing and development of new aircraft.

It is known to use strain gauges as part of such load measuring devices. These, however, have disadvantages associated with them. For example, strain gauges may have to be bonded to the structure being monitored, may require specialist maintenance, may only be able to provide a local load measurement, may be easily damaged, may be susceptible to noise and/or may require temperature compensation.

SUMMARY OF THE INVENTION

It is an object of the present invention to provide a load measuring apparatus for use on an aircraft which mitigates one or more of the disadvantages outlined above. Alternatively, or additionally, it is an object of the present invention to provide an improved apparatus capable of providing information from which an indication of the load sustained by an aircraft component can be ascertained.

The present invention provides an aircraft including an apparatus for measuring a load on an aircraft component, the apparatus including a processing unit, a controllable source of light, and a detector able to detect light emitted from said source, wherein the source and the detector are situated in a region that is protected from the environment to the exterior of the aircraft, the apparatus is arranged so that, when the aircraft component is subjected to a load of the type to be measured, relative movement of the detector and the position of the light from the source in the region of the detector is caused, the detector in use generates in response to light received from the source a signal that is received by the processing unit, the signal being dependent on the relative positions of the detector and the light from the source in the region of the detector, and the processing unit is arranged to provide an output signal dependent on the load sustained by the aircraft component.

Protecting the source and the detector from the environment to the exterior of the aircraft enables the detector and source to function without being significantly affected by environmental conditions such as for example water in the atmosphere.

The loads sustained by the aircraft component can cause a part of the component to elastically deform (for example by bending, twisting and otherwise moving and/or deforming) in relation to the rest of the aircraft. Thus, by measuring such movements it is possible to ascertain an indication of the load sustained by the aircraft component.

One advantageous and preferable feature of the apparatus of an embodiment of the present invention is that there need be no electrical contact between the source and detector. Preferably, the apparatus is so arranged that, in use, the light from the source detected by the detector travels through a gaseous medium, at least for the majority of the distance between the source and the detector, and preferably for the entire distance.

It will be understood that it is within the scope of the present invention for the detected light received from the source to have traveled on a path that diverges from the notional straight line on which the detector and the source lie. For example, the detector of the apparatus of the invention may be arranged to receive reflected radiation from the source. In such a case, the detector and source could be placed adjacent to each other, for example. In such a case it will be understood that when the aircraft component is subjected to a load of the type to be measured, relative movement will occur between the detector and the position of the light from the source in the region of the detector, but that there may be no relative movement between the detector and the source.

Preferably the signal that is generated by the detector in response to light received from the source is dependent on the relative positions of the source and detector. Thus, in accordance with this preferred feature, the present invention provides an apparatus, for example of an aircraft, for measuring a load on an aircraft component, the apparatus including a processing unit, a controllable source of light, and a detector able to detect light emitted from said source, wherein the source and the detector are situated in a region that is protected from the environment to the exterior of the aircraft, the apparatus is arranged so that, when the aircraft component is subjected to a load of the type to be measured, relative movement of the source and detector is caused, the detector in use generates in response to light received from the source a signal that is received by the processing unit, the signal being dependent on the relative positions of the source and detector, and the processing unit is arranged to provide an output signal dependent on the load sustained by the aircraft component.

At least one of the source and detector may be fixed at a first position relative to a first part of the aircraft component. At least one of the source and detector may be fixed at a second position relative to a second part of the aircraft component, the first and second parts of the aircraft component being spaced apart. Preferably, one of the source and detector is fixed at the first position and the other of the source and detector is fixed at the second position.

The region in which the source and the detector are situated is preferably defined by a housing. The section of housing in which the source is situated may be freely moveable relative to the section of housing in which the detector is situated. There is preferably no significant resistance to relative movement, within preset limits, in at least one direction of the two sections of the housing. The two sections may be joined by a flexible joint. The flexible joint may for example comprise an annular bellows-shaped structure.

The housing is preferably in the form of a sealed container. The sealed container may for example provide the means for protecting the source and the detector from the environment to the exterior of the aircraft. Preferably, the sealed container is watertight.

The sealed container is preferably air tight. The sealed container preferably contains a protective atmosphere. The protective atmosphere may be in the form of a gas that has a relative humidity of less than 10% ("relative humidity" in this being the percentage of water by volume compared to the maximum amount of water the same volume of gas can hold at 1 atmosphere pressure and 25 degrees Centigrade). The protective atmosphere may be in the form of a gas that has a relative humidity of less than 5% and preferably less than 2%. The sealed container may contain a gas that has an oxygen content of less than 5% by volume, and preferably less than 1% by volume. The sealed container may contain a gas that has a nitrogen content of greater than 90% by volume, and more preferably greater than 95%.

The processor and/or any power sources that may be provided may be positioned outside of the housing.

The light source may comprise a solid-state source of light, for example an LED or a laser source. The detector may comprise a solid-state detector of light, for example a photo-diode or a charge-coupled diode (CCD).

The detector preferably comprises a plurality of spaced apart sensors. The sensors in use preferably generate in response to light received from said source a signal or signals that in use are received by the processing unit, which signal or signals being dependent on the relative positions of the sensors and the light from the source in the region of the sensors. The sensors in use may generate in response to light received from said source a signal or signals that in use are received by the processing unit, which signal or signals being dependent on the relative positions of the source and the sensors.

The apparatus may be so arranged that the signal generated by the detector, whether in dependence on the relative positions of the sensors and the light from the source in the region of the sensors or on the relative positions of the source and detector, depends on the relative levels of intensity of light received by the sensors. The sensors may each be arranged to generate a current in dependence on the amount of light received by the sensor.

The signal generated by the detector may itself comprise a plurality of separate signals. The signal generated by the detector may, for example, comprise a plurality of separate components, each component relating to the signal generated by each sensor. The processing unit may for example perform a calculation involving values ascertained from the respective components. For example the processing unit may receive two signals, if necessary converting the two signals into digital signals, and then calculate the difference between the two respective digital signals. The difference so calculated may thus provide an indication of the amount of movement in a given direction of two of the sensors relative to the position of the light from the source in the region of the sensors. The difference so calculated may provide an indication of the amount of movement in a given direction of two of the sensors relative the source. The signal generated by the detector may alternatively, or additionally, comprise one or more components, wherein each component is representative of a combination of the signals from two or more sensors. The signals from the sensors may for example be combined before they are received by the processing unit. For example, the sensors may generate analogue signals and signals from two sensors may be combined in a comparator circuit, the output (a single signal) being sent to the processing unit.

A calculation may be performed by the processing unit in order to ascertain the movement of the detector relative to the source in a given direction, the calculation involving a comparison of the signal from one sensor with the signal from another sensor. The comparison may simply consist of ascertaining the arithmetic difference between the magnitudes of the signals.

The shape and intensity profile of the light emitted by the source and the shape and position of the sensors are preferably such that the intensity of light received by the sensor at a multiplicity of spaced apart positions along an axis perpendicular to the notional line linking the source and a sensor increases (in one direction) with each successive position along the axis. Preferably, the intensity of light received by the sensor at positions along a section of an axis perpendicular to the notional line linking the source and a sensor varies substantially monotonically.

The controllable source may emit a focused beam of light. In such a case, each sensor may produce a signal that is dependent on the area of each sensor within the beam of light. The beam of light is conveniently emitted substantially in one direction. It will be understood that the beam of light may change direction after being emitted from the source, for example by way of a reflection. The focused beam may be such that the intensity of light is substantially constant within a significant portion of the cross-section of the beam. Alternatively, or additionally, the intensity of light may vary depending on the position within the beam. The intensity of light may be at a peak in the middle of the beam and varies monotonically with distance from the middle. The beam may have an intensity profile that is symmetrical. The beam may have an intensity profile that in cross-section forms contours of equal intensity that are substantially circular in shape.

The apparatus may be so arranged that the signals from a pair of sensors are used to produce a signal representative of the position of the detector relative to the position of the light from the source in the region of the detector, in a single given direction. The apparatus may be so arranged that the signals from a pair of sensors are used to produce a signal representative of the position of the detector relative to the position of the source in a single given direction. The single given direction will generally be in a direction that is not perpendicular to the notional straight line connecting the two sensors, and is preferably parallel to the notional straight line.

Preferably the source is fixedly mounted in relation to a first location on the aircraft and each of the plurality of sensors is fixedly mounted in relation to a second location on the aircraft, wherein movement of the first and second locations relative to each other depends on the relative movement of the aircraft component. In such a case, the apparatus is preferably arranged so that movement of the plurality of sensors in a first direction relative to the source causes the intensity of light detected by one of two sensors to increase and causes the intensity of light detected by the other of the two sensors to decrease. Thus, the difference in the respective signals generated by the two sensors facilitates the provision of an indication of the amount of movement in the first direction of the two sensors relative to the source. In such a case, the processing unit preferably effectively calculates an output signal representative of the relative movement of the first and second locations.

The apparatus may conveniently be so arranged that the processing unit need never ascertain an absolute value of the relative movement of the detector, whether relative to the position of the radiation from the source in the region of the detector or relative to the source. The signal from the detector may for example be converted directly into a signal representative of a load without there being an intermediate step of converting the signal from the detector into a signal relating to the relative movement or separation in a given direction. The apparatus may be so arranged that only the change in relative positions of the detector and the light from the source in the region of the detector may be ascertained from the signal from the detector that depends on the relative positions of the detector and the light from the source in the region of the detector. Preferably the apparatus is so arranged that only the change in relative positions of the source and the detector may be ascertained from the signal from the detector that depends on the relative positions of the source and the detector.

The detector need only have one pair of sensors if the load to be measured is in one direction only. However, the detector may be able to measure loads in more than one direction. The detector may facilitate the measurement of relative movement along two substantially orthogonal axes. The detector may therefore include two or more pairs of sensors. For example, the plurality of sensors may comprise a first pair of sensors and a second pair of sensors, wherein, in use, the signals generated by the first pair are used to generate an output representative of the displacement of a part of the aircraft component in a first degree of freedom and the signals generated by the second pair are used to generate an output representative of the displacement of a part of the aircraft component in a second degree of freedom. The detector may comprise a quad-cell arrangement comprising four sensors arranged in close proximity to each other.

The notional line extending from the middle of one sensor of a pair to the other sensors of the pair may intersect the notional line extending from the middle of one sensors of another pair to the other sensors of that other pair. The notional lines may mutually bisect each other. The notional lines are preferably transverse to each other and may be perpendicular. The apparatus may for example comprise a detector having a pair of sensors in the form of a cross.

It will be appreciated that it would be possible for one sensor to form one half of each of two pairs of sensors, so that only three sensors need be supplied in order to provide the ability of the detector to measure loads in two dimensions.

The arrangement of the apparatus is preferably such that the notional straight line on which each pair of sensors lies is substantially transverse to the notional straight line on which the source and detector lie.

The sensors may be arranged such that each sensor is separated from each other sensor. The separation between a pair of sensors may be set in dependence on the wavelength of light emitted by the source and/or the resolution of measurement required. The sensors within a pair of sensors may be separated by only by a relatively small distance so that the sensors in each pair may be considered as being adjacent to each other.

The apparatus may be so arranged that in use the signal generated by the detector in response to light received from the source is representative of a relative position of the detector and the light from the source in the region of the detector, the position having at least two degrees of freedom. The apparatus may be so arranged that in use the signal generated by the detector in response to light received from the source is representative of a relative position of the source and detector, the position having at least two degrees of freedom.

The apparatus may include a pair of detectors. The pair of detectors may be positioned in a single housing.

The pair of detectors may be arranged to enable a torsional force sustained by the component to be measured. Alternatively, or additionally, the pair of detectors may be provided to enable the processor to compensate for such torsional loads on the housing in cases where the apparatus is used to measure a bending load or shear load. It might for example be desirable to compensate for torsional loads when measuring loads on a bent component.

Preferably, the pair of detectors facilitate the measurement of relative movement along two substantially parallel and spaced apart axes. Such a measurement provides information on relative translational movement in a direction parallel to the two axes and also on relative rotational movement about an axis perpendicular to the plane containing the two axes.

Each detector in the pair is preferably associated with a respective light source. Each of the pair of detectors may be able to measure the relative position of the or each source and the or each detector associated with the or each source, the position having two degrees of freedom.

The apparatus may be arranged to provide an output that is representative of the load sustained by the component. The output is preferably calculated by the processing unit. The processing unit may when calculating the output use data concerning the relationship between the relative movement of the component and the load sustained by the component. The data is preferably stored in electronic memory in or immediately accessible by the processing unit. The data may be calculated in advance by means of mathematically modeling the loading of the component, for example making use of finite element analysis techniques. The data may be ascertained in advance by making calibration measurements in relation to the aircraft component (or a component substantially identical thereto). Both such mathematical modeling techniques and calibration measurements may be used in combination. For example, a multiplicity of calibration measurements may be made of the relative movement of the aircraft component in response to successive different known loads. The processing unit may perform interpolation calculations when calculating the output with the use of the data.

The processing unit may form part of a control unit that is arranged to control the light emitted by the source. Alternatively, the processing unit need not perform any control function. The processing unit may include, or be in the form of, a signal processor and/or a micro-processor. The processing unit may comprise physically separate sub-units.

The source may be arranged to emit visible light. Such sources are readily available. The light emitted by the source may comprise invisible light. The source is preferably arranged to emit light having an intensity profile that peaks at a wavelength in the range of 300 nm to 1100 nm, and preferably within the range of 600 nm to 1000 nm. Other wavelengths of electromagnetic radiation may also be suitable of course.

The present invention may have application in relation to assessing the load on any aircraft component, where loading of the component causes movement of the component. The invention is of particular benefit in the case where the aircraft component is at least part of a landing gear of an aircraft.

As mentioned above, the aircraft component may be a part of a landing gear. The part of the landing gear may be a leg, or part thereof, of an aircraft landing gear. For example the part of the landing gear may be the outer cylinder of a shock absorbing part of the leg. The part of the landing gear may be a wheel axle. The part of the landing gear may be a brake pin. The part of the landing gear may be a bogey. It will be understood that the brake pin is the component that connects the brake rod and the brake piston housing of a landing gear.

The source and detector are preferably arranged to measure a substantially horizontal component of the movement made by the aircraft leg under loading.

The aircraft component could be at least a part of a wing of an aircraft. For example, the load sustained by a portion of a wing could be assessed by measuring the movement of one location on the wing relative to another.

The aircraft component could be in the form of a control surface, such as an aileron. The aircraft component could be in the form of a part of the fuselage. The aircraft component could be in the form of a horizontal and/or vertical lifting surface.

The aircraft may further include a load control system. The load control system may be arranged to monitor a measurement of the load sustained by the aircraft component, the measurement being ascertained from the output signal from the processing unit. The load control system is preferably arranged to control a part of the aircraft in dependence on the measurements so monitored. For example, the load control system may be arranged to control a part of the aircraft so as to reduce the loads sustained by the aircraft in the event that the load control system calculates that the load exceeds given criteria. The given criteria could simply be a preset threshold. The given criteria could alternatively or additionally be time dependent. The given criteria may be a threshold that varies in dependence on other parameters.

The load control system may be in the form of a braking control system. The aircraft component may in that case be a leg of an aircraft landing gear, a wheel axle or a brake pin for example. Preferably, the load control system monitors measurements from a plurality of detector-sensor pairs, which may be provided on different components. The braking control system may be arranged to control the braking in dependence on the loads monitored by the braking control system. The braking control system may for example be arranged to be able to control the braking force applied to the wheels of the landing gear. The braking control system may be arranged so that in the event that the braking control system detects that the load sustained by the leg exceeds a given threshold value, the level of braking is reduced. The braking control system may be arranged so that the output signal generated by the processing unit is received by the braking control system. The braking control system may be arranged to monitor the load sustained by the aircraft leg and to control the braking force applied in order that under normal operating conditions the load on the leg of the landing gear does not exceed a preset threshold. The preset threshold may for example correspond to the maximum load that the aircraft leg is designed to withstand during normal operation.

The load control system and the processing unit of the apparatus for measuring the load are preferably in the form of physically separate systems. However, it would be possible for the load control system and the processing unit to be part of a single control system. For example, a computer processor could perform the functions of both the load control system and the processing unit of the load measuring apparatus.

In accordance with the present invention there is also provided apparatus for measuring a load on an aircraft component, the apparatus including a controllable source of light, and a detector able to detect light emitted from said source, wherein the source and the detector are situated in a housing that defines a protected region, the apparatus is arranged so that, when the housing is subjected to a load of the type to be measured, relative movement of the detector and the position of the light from the source in the region of the detector is caused, the detector in use generates in response to light received from the source a signal that depends on the relative positions of the detector and the light from the source in the region of the detector, the signal being suitable for conversion into an output signal that depends on the load sustained by the aircraft component.

In accordance with the present invention there is also further provided apparatus for measuring a load on an aircraft component, the apparatus including a controllable source of light, and a detector able to detect light emitted from said source, wherein the source and the detector are situated in a housing that defines a protected region, the apparatus is arranged so that, when the housing is subjected to a load of the type to be measured, relative movement of the source and the detector is caused, the detector in use generates in response to light received from the source a signal that depends on the relative positions of the source and the detector, the signal being suitable for conversion into an output signal that depends on the load sustained by the aircraft component.

The source of light, the detector and the housing are preferably adapted to be suitable for use as the housing, source and detector of the apparatus of the aircraft according to any aspect of the present invention as described herein.

The present invention also provides an apparatus including a source, a detector and a processing unit all being adapted to be suitable for use as the source, the detector and the processing unit of the apparatus of the aircraft according to any aspect of the present invention as described herein.

According to another aspect of the invention there is provided an apparatus for measuring a load on an aircraft component, the apparatus including a processing unit, a controllable emitter of electromagnetic radiation, and a detector able to detect radiation from said emitter, wherein the apparatus is arranged so that, when the aircraft component is subjected to a load of the type to be measured, relative movement of the detector and the position of the light from the emitter in the region of the detector is caused, the detector in use generates in response to electromagnetic radiation received from the emitter a signal that is received by the processing unit, the signal being dependent on the relative positions of the detector and the light from the emitter in the region of the detector, and the processing unit is arranged to provide an output signal dependent on the load sustained by the aircraft component. The apparatus may be arranged such that when the aircraft component is subjected to a load of the type to be measured, relative movement of the detector and the emitter is caused, and the signal that is received by the processing unit is dependent on the relative positions of the detector and the emitter. In accordance with the present invention there is also provided a method of measuring a load on an aircraft component, the method including the following steps:

causing light to be emitted from a source, measuring the light received by a detector from the source, the light measurement being dependent on the relative movement of the detector and the position of the light from the source in the region of the detector caused by a load on the aircraft component, protecting the source and the detector from the environment to the exterior of the aircraft, and calculating an indication of the load sustained by the aircraft component from the light measurement together with data concerning the relationship between the light measurement and the load sustained by the component.

Preferably the light measurement is dependent on the relative movement of the detector and the source caused by a load on the aircraft component.

The step of calculating an indication of the load may be performed as a single operation using the signals from the results of measuring the light by the detector. The method may include a separate step of calculating from the light measurement an indication of the relative movement of the source and detector. The method may include a separate step of calculating from the light measurement an indication of the relative movement of the detector and the position of the light from the emitter in the region of the detector. Such calculation may involve the use of data concerning the relationship between the light measurement and the relative movement of the source and detector, or more preferably the use of data concerning the relationship between the light measurement and the relative movement of the detector and the position of the light from the source in the region of the detector. The indication of the relative movement may relate directly to the relative movement and/or position of a part of the aircraft component. In such a case the step of calculating an indication of the load sustained by the aircraft component may be performed by calculating the load from the calculated indications of the relative movement together with data concerning the relationship between the relative movement of the component and the load sustained by the component. The indication of the relative movement of the detector and the position of the light from the source in the region of the detector, for example the indication of the relative movement of the source and detector, and the indication of the load may each be in the form of a numerical value. The numerical value(s) may be represented by digital or analogue electronic signals. The data used in the method may be calculated and/or determined by calibration measurements in advance and for example stored in a memory unit.

The apparatus of the invention may be used in the method of the invention. Thus, features described with reference to the apparatus of the invention may be incorporated into the method of the invention. Also, features described with reference to the method of the invention may be incorporated into the apparatus of the invention. For example, features already described with reference to the apparatus of the invention are described below with reference to their application in the method of the invention.

The detector used in the method preferably comprises a plurality of sensors. An indication of relative movement of the detector and the position of the light from the source in the region of the detector, for example an indication of the relative movement of the detector and the source, may thus be calculated from measurements of the relative amounts of light received by the sensors. The sensors may include a pair of sensors and the method preferably performs a calculation, for example to calculate an indication of the relative movement of the detector and the source, using the difference between the signals from the pair.

The indication of the relative movement of the detector and the position of the light from the source in the region of the detector may comprise an indication of movement in at least two dimensions or degrees of freedom. Preferably the indication of the relative movement of the source and detector comprises an indication of movement in at least two dimensions or degrees of freedom. The indication of the load sustained by the aircraft component may comprise an indication of the load in at least two dimensions or degrees of freedom.

The present invention also provides a method of controlling the loads sustained by an aircraft component. The method according to this aspect of the invention may include monitoring the loads sustained by the aircraft component by using the apparatus for measuring loads in accordance with any of the aspects of the present invention or by performing the method of measuring a load in accordance with any of the aspects of the present invention. The method according to this aspect of the invention may include a step of controlling a part of the aircraft in dependence on the results of the monitoring of the loads. The method according to this aspect of the invention may be performed when braking and/or maneuvering the aircraft on the ground. The method may for example be performed when maneuvering and braking the aircraft on the ground immediately after touch down when landing the aircraft. The aircraft may be braked by means of the application of one or more wheel brakes. Accordingly, the present invention also further provides a method of maneuvering an aircraft on the ground, the method including a step of controlling the aircraft according to the above-described method, wherein the loads on the leg of a landing gear of the aircraft are monitored and the steering and/or braking of the aircraft is controlled in dependence on the loads monitored.

The present invention may have application in relation to the measuring of loads on components, objects, or the like other than aircraft components. For example, loads on buildings or other structures such as bridges could be measured by means of the present invention. Thus the invention more generally provides an apparatus for measuring loads and a method of measuring loads as set out above except that the object of the measurements need not necessarily be in the form of an aircraft component. Also, the present invention may have a wider application in relation to the measuring of relative movement between two points (or two locations). The apparatus may but need not necessarily be arranged to measure the relative movement between two locations on an aircraft. The apparatus could for example be used to measure and/or monitor the change in shape of any object. Other features of the present invention as described herein may be incorporated, where appropriate, into this more general aspect of the invention.

DESCRIPTION OF THE DRAWINGS

Embodiments of the present invention will now be described by way of example with reference to the accompanying schematic drawings of which.

DETAILED DESCRIPTION

Figure 1A:
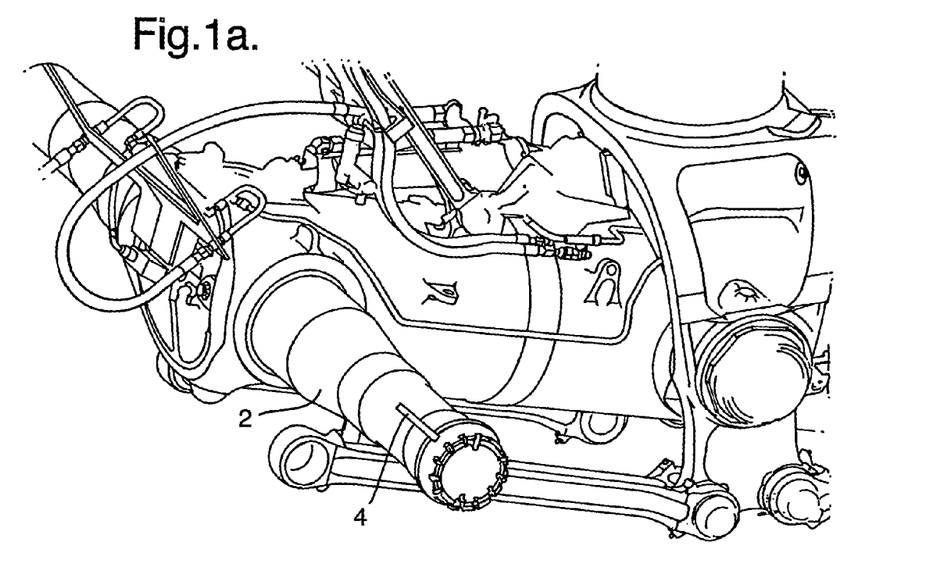
FIGS. 1*a* and 1*b* show a wheel axle on which two load detectors of a load monitoring system are mounted in accordance with a first embodiment of the invention.
Figure 1B:
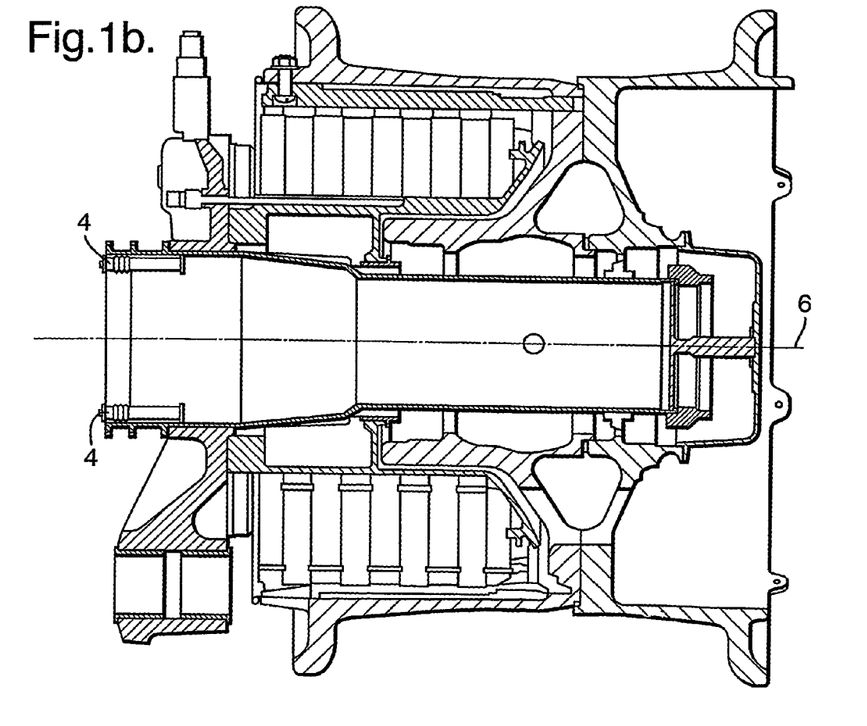

FIGS. 1*a* and 1*b* show a wheel axle 2 (the wheel itself not being shown in those Figures) including two load detectors 4 that form part of a load measuring system according to a first embodiment of the invention. Each load detector 4 is in the form of a separate displacement measurement system 4. The load detectors 4 are provided to monitor the part of the braking force directly reacted through the wheel axle 2 and also to monitor the vertical load.

Figure 1C:
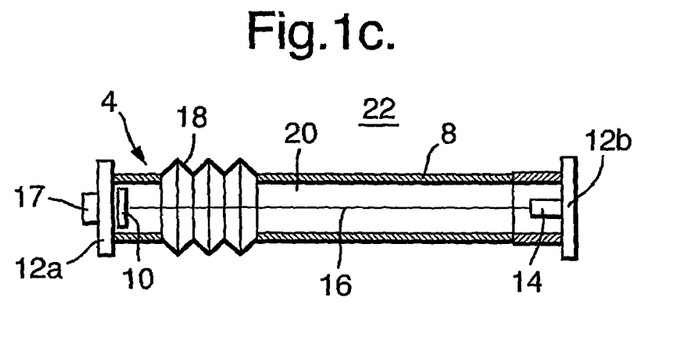
FIG. 1*c* is a cross-sectional view of one of the load detectors shown in FIG. 1*a*.

The two displacement measurement systems 4 (one of which being shown highly schematically in FIG. 1a) are elongate in shape and extend a short distance in the direction of the axis of the axle 2, their axes being spaced apart, and parallel to, and on opposite sides of, the central axis 6 of the wheel axle 2. With reference to FIG. 1c, each displacement measurement system 4 comprises a sealed cylindrical container 8 having one end 12a within which there is mounted a quad-cell photodiode detector 10 (a detector comprising four photodiodes) and an opposite end 12b within which there is mounted a laser source 14, which in use directs a focused beam 16 of light towards the quad-cell detector 10. Optical elements (not shown) are positioned in front of the laser 14 to focus the light beam 16. Power to the laser 14 and signals from the detector 10 are provided by respective electric cables (not shown) that lead to an electrical connector 17 on the outside of one end 12a of the container 8.

The four photodiode sensors are fixed in position relative to each other, but as mentioned above are mounted such that there may be relative movement between the sensors and the light source. In use, light from the laser 14 is focused on to the detector 10 as a spot. The position of the centroid (the point at the centre) of this spot is calculated by comparison of the signals from the four quadrants (photodiode cells) of the quad-cell arrangement 10. This calculation may be explained by considering the case where an equal intensity of light from the focused light beam 16 is received by each sensor. If the detector 10 or the laser light source 14 moves then the area of one sensor may become more exposed to the beam 16 than the opposing sensor in the detector 10, thereby inducing a greater current in the sensor and a reduced current in the opposite sensor, respectively. The differential current thus indicates the relative position of the source 14 and the detector 10.

For each pair of opposing sensors in the detector 10, the currents from the pairs of opposite sensors in the detector 10 are combined in a difference circuit of a processor (not shown) that receives the signals from the respective displacement measurement systems 4. The difference circuit effectively subtracts the current from one sensor of a pair from the current from the other sensor of the pair. When the sensor pair are in the "zero" position with respect to the beam 16 of light from the laser 14, the current induced in each sensor is the same, thus the resultant output signal from the difference circuit is zero. Thus, the output from the difference circuit depends on the component of relative movement between the source and detector 10 along a single axis (in this case the x-axis). The output of the detector 10 can therefore be used to measure relative movement with two degrees of freedom.

The form of the relationship between the outputs from the difference circuits and the relative displacement is programmed into the processor during a calibration process. The signals from the difference circuits are then processed to calculate a load on the basis of a load model from the data relating to the relative displacement.

The solid-state laser and photodiodes used to monitor the loads acting on the landing gear of the aircraft all have a relatively high level of resolution and bandwidth. The detector 10 of FIGS. 1a to 1d is able to detect displacements of ±1,000 microns from the normal (central position) with a resolution of about 5 microns.

It will of course be appreciated that the rest position need not necessarily be one in which the beam 16 is centrally aligned with the sensors of the detector 10 or one where the currents generated by all of the sensors are equal. There may of course be advantages in having an off-centre rest (or unloaded) position if the loading on the component is likely to be in one direction more than another.

During the braking phase in particular the changes in the loads measured by the displacement measurement systems 4 are of a high frequency, fast transient mode. The solid-state devices used in this embodiment are able to detect such high frequency changes (unlike certain mechanical means such as strain gauges).

The respective ends 12a, 12b of the sealed container 8 are connected by means of a flexible bellows 18 arrangement which allows one end 12 of the container to move freely within certain limits relative to the other end 12 in the three orthogonal directions. The respective ends 12 of the container 8 are each fixedly mounted via expandable rings (not shown) in relation to spaced apart portions of the interior of the axle 2. The container contains dry (less than 0.1% relative humidity) nitrogen gas 20 (at least 99% pure), which as a result of the container 8 being sealed protects the laser 14 and photodiodes of the detector 10 from the external atmosphere 22.

Movement of the respective portions of the axle 2 caused by shear and bending loads on the axle 2 causes movement of one end 12 of each displacement measurement system 4 relative to the other end 12. Differential measurements of displacement of the spot relative to the centre of the detector 10 are sent as electronic signals to the processor (not shown). By measuring the displacements by means of two displacement measurement systems 4, the system compensates for errors generated by the torsion on the bent axle 2. The displacement measurements are correlated with angular or lateral displacement of the incoming light (by means of the data in the pre-calibrated processor) and then converted into measurements of the shear load on the axle 2. The shear load measurements calculated may then be converted into indications of the vertical load on each wheel. As will be explained in further detail below, the load measurements are monitored over time by the processor.

Figure 1D:
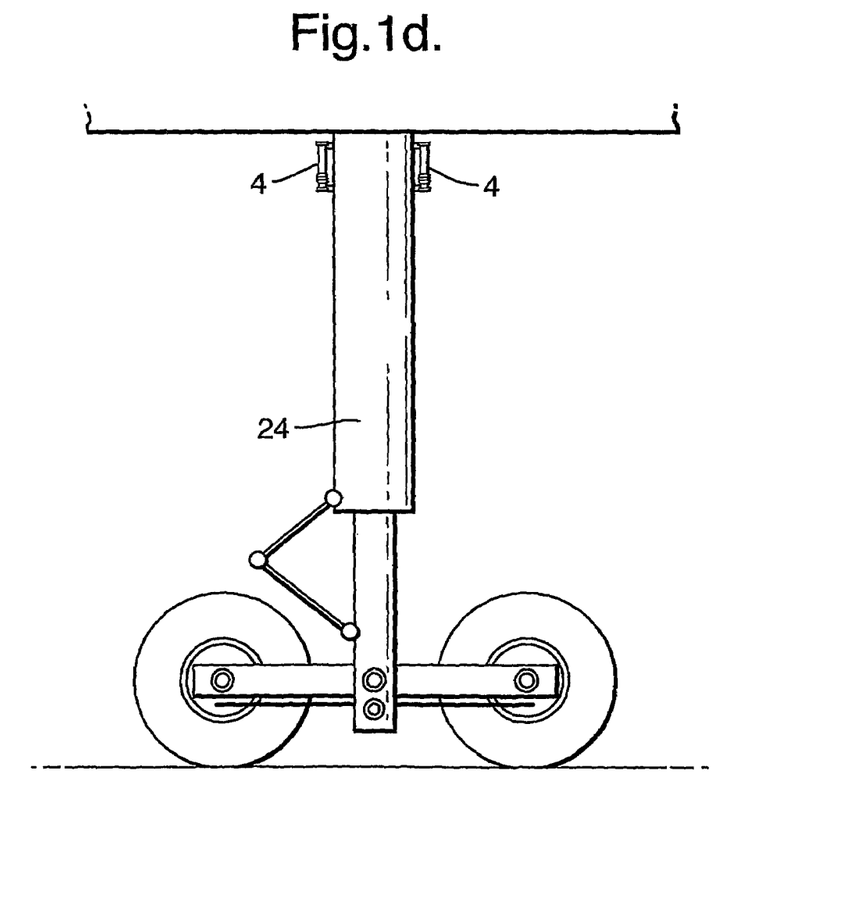
FIG. 1*d* shows a landing gear leg on which a further load detector of the load monitoring system of the first embodiment of the invention is mounted.

The load measuring system includes two further displacement measurement systems 4 provided on opposites sides on the exterior of the outer cylinder of the landing gear 24 as shown in FIG. 1d. The arrangement and configuration of each displacement measurement system 4 is identical to that shown in FIG. 1c. The signals from these displacement measurement systems 4 are sent to the processor. Thus the processor of the load measuring system additionally receives signals from these displacement measurement systems 4 which facilitate the calculating and monitoring of the global braking load, side loads and torsional loads around the landing gear leg 24.

Each of the main landing gears on the aircraft and each of the wheels on each gear are provided with displacement measurement systems in the manner described above with reference to FIGS. 1a to 1d. Each displacement measurement system sends signals to the processor in response to the displacements measured. The processor of the load measuring system therefore receives signals from which it calculates in use various loads including the vertical load on each wheel, and the bending loads on each landing gear. Load information ascertained by the load measuring system is used to monitor the vertical loads on the aircraft during landing on a "per wheel" basis, and to ascertain the on-board weight and balance, and is also used by a braking control system, and a torque limiting system.

The operation of the load measuring system in use on an aircraft when landing will now be described with reference to the first embodiment. When the wheels of the landing gear are braked, after touchdown during landing for example, the resultant force on the landing gear tends to bend the landing gear leg about a horizontal axis that is perpendicular to the direction of movement of the aircraft. (In the description of the accompanying drawings the x-axis is taken to be the longitudinal axis of the aircraft, the y-axis is the other horizontal axis perpendicular to the x-axis and the z-axis is vertical.) Also, each wheel, associated axle and brake system are subjected to various loads, at least some of which are also monitored, such loads including torques and loads along the x-axis. The system is of course also able to monitor the torsional load around the landing gear leg and the side loads (along the y-axis) on a per landing gear basis.

After touchdown the brakes are applied and the loads on the landing gear and on the braking system become significant. The braking of the aircraft is controlled by a brake control system (not shown) that controls the braking in such a way as to reduce the likelihood of the loads on the landing gear that are monitored becoming greater than preset criteria/thresholds. The braking of the aircraft is also controlled by a torque limiting system (also not shown) that controls the braking in such a way as to reduce the likelihood of the torques induced by braking becoming greater than preset criteria/thresholds. The loads generated during ground maneuvering (mainly during the braking phase) are measured as they react through the landing gears of an aircraft. The processor monitors the loads as calculated, which in this embodiment include shear loads on the axle and vertical loads, horizontal loads and torsional loads on the landing gear leg. The loads are monitored continuously and if any of the signals (or the total of the signals) representative of the loads calculated by the processor exceed a threshold, the brake control system and/or the torque limiting system will sense the overloading by means of signal(s) supplied to the processor and the braking force will then be immediately reduced accordingly. This system of monitoring the loads and adjusting the braking accordingly is in the form of a feedback system.

By monitoring these loads, the aircraft can be controlled to reduce the maximum loads sustained by the aircraft and thus the weight of the landing gears and of the airframe may be reduced. The braking phase may also be controlled more effectively thereby enabling higher braking efficiency and less fatigue problems for the aircraft. The system also allows the implementation of the on board weight and balance measurements for the aircraft to be calculated with a per wheel resolution. The system enables the fatigue life of a landing gear to be monitored in more detailed manner than hitherto possible with mechanical strain gauges of the prior art. The load measuring apparatus is tolerant to different weather conditions, because the container is completely sealed.

The use of optical sources and sensors in a system for load measuring as described above in relation to the drawings has many potential advantages over the known use of strain gauges. The sensors not only provide good resolution and linearity, and measurements with two degrees of freedom (being easily scalable to provide more degrees of freedom), but are also suitable for measuring loads over a wide range of frequencies (including static loads and high frequency loads). Also the load measuring system of the above-described embodiment does not suffer from some of the problems associated with strain gauge based systems. The installation, use and maintenance of strain gauges require the skills of a specialist. Some strain gauges use very thin and delicate electrical wires to transmit information regarding the deformation being measured. Such thin wires can be easily damaged and generally operate at low electrical powers, and thus make the strain gauge susceptible to noise. The output of strain gauges is also often temperature sensitive and thus some strain gauges need temperature compensation. The gauges may require a settling down time after application, they are not easily maintainable, and a lengthy calibration process is often required. The solid-state devices as used in the manner described above in relation to the first embodiment mitigate at least some of the afore-mentioned disadvantages.

Figure 2A:
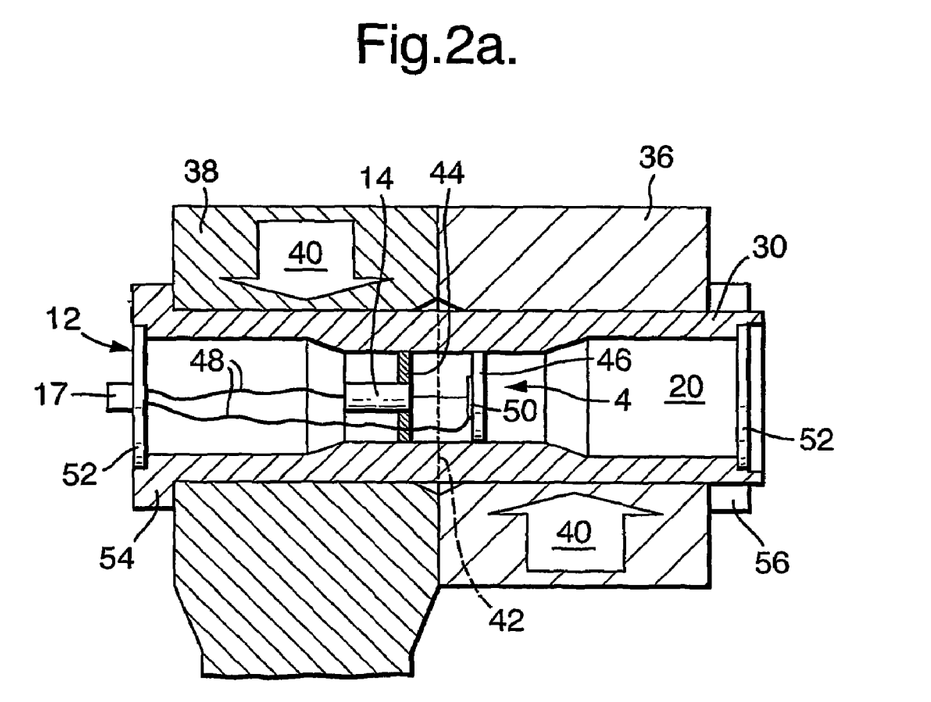
FIG. 2*a* is a cross-section of a landing gear showing a brake pin including a load detector of a load monitoring system according to a second embodiment of the invention.
Figure 2B:
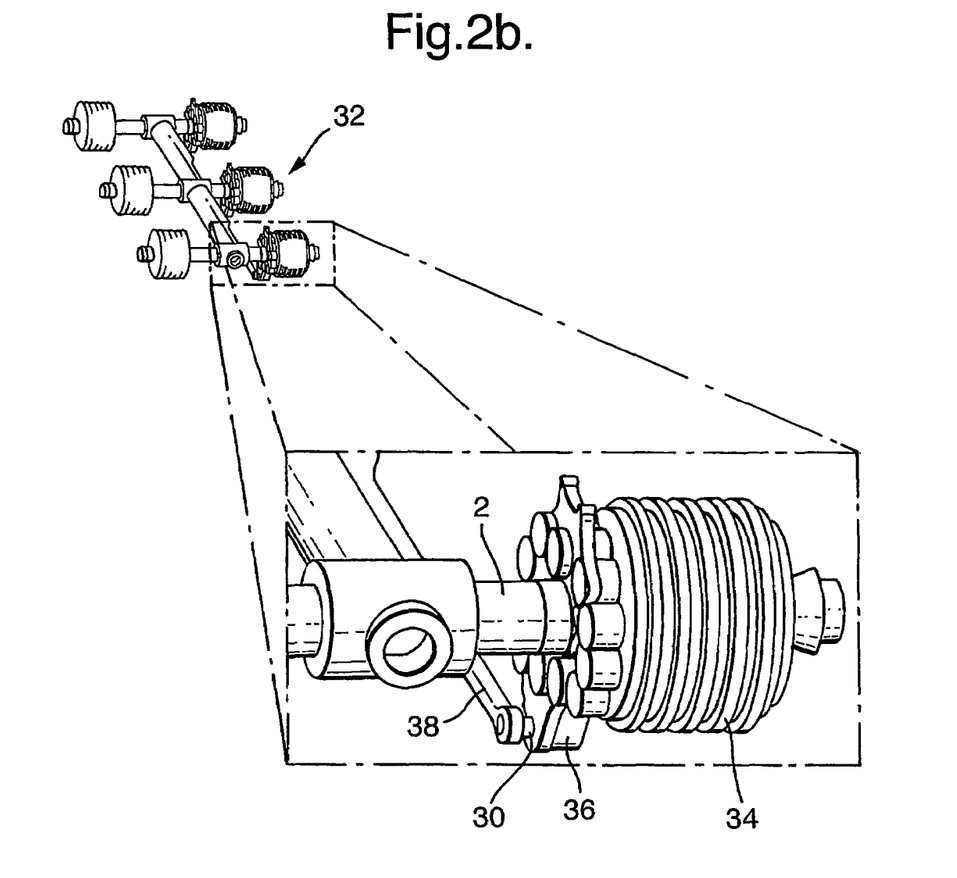
FIG. 2*b* shows two perspective views (one showing an enlarged portion of the other) of a landing gear bogey illustrating the position of the brake pin shown in FIG. 2*a*, and FIGS. 3*a* and 3*b* show a brake pin including a load detector of a load monitoring system according to a third embodiment of the invention.

FIGS. 2a and 2b show a second embodiment of the invention. In this embodiment, the load measuring system receives load information concerning the loads on a brake pin 30. These measurements can either supplement or replace the measurements made in respect of loads on the wheel axle 2. As illustrated in FIG. 2b, the bogey 32 of the landing gear accommodates six wheels (not shown in FIG. 2b), each of which being mounted for rotation about an axle 2 on which there is also mounted a set of brakes comprising brake disks 34 and a piston housing 36. Torque during braking is reacted through a brake rod 38 that is attached to the brake piston housing 36 via a brake pin 30 (illustrated schematically in FIG. 2b). Thus, information concerning the braking torque and the vertical load reacted through the wheel may be measured by monitoring loads, and in particular shear loads, in the brake pin 30. FIG. 2a shows in cross-section the brake pin 30 and parts of the piston housing 36 and the brake rod 38.

The effects of the loads applied during braking on the brake pin 30 tend to be in the form of shear and bending loads (represented by arrows 40) that modify the distance in the vertical direction (as shown in FIG. 2a), parallel to the shear plane 42, between two points, one on each side of the shear plane 42, separated by a distance (in the horizontal direction, as shown in FIG. 2a). This displacement is measured via a displacement measurement system 4 that is mounted within the hollow interior of the brake pin 30. The displacement measurement system 4 comprises a solid-state laser 14 mounted on a first expandable ring 44 to one side of the shear plane 42 and a digital charge coupled device (CCD) array 50 mounted on a second expandable ring 46 to the opposite side of the shear plane 42. Power to the laser 14 and signals from the CCD array 50 are provided by respective electric cables 48 that lead to an electrical connector 17 on the outside of one end 12 of the brake pin. The interior of the pin 30 is sealed, by means of sealing plugs 52, and is filled with dry nitrogen 20. The pin 30 has a flange 54 at one end 12 to engage with the brake rod 38 and has a screw thread at its opposite end onto which a nut 56 is screwed that engages with the brake piston housing 36 thereby providing a mechanical connection between the rod 38 and the piston housing 36.

In the case where the first and second embodiments are combined, the processor of the load measuring system will have information concerning the loads on the brake pin, the wheel axle and the landing gear outer cylinder, thereby facilitating the in-service monitoring of the loads imposed on each wheel and each landing gear with more information, accuracy and reliability than hitherto feasible with the use of mechanical strain gauges. This in turn allows the performance of the brake control system and torque limiting system to be greatly improved, and allows the loads on the landing gear and wheels to be more effectively monitored and controlled (and kept within predetermined limits).

Figure 3A:
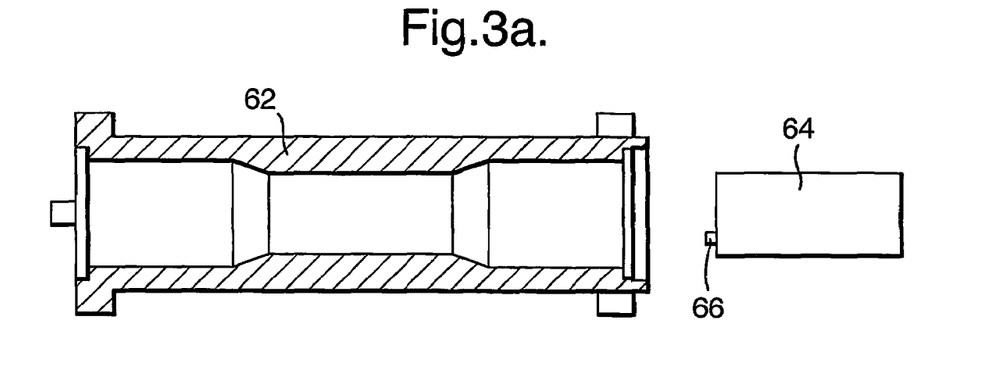
Figure 3B:
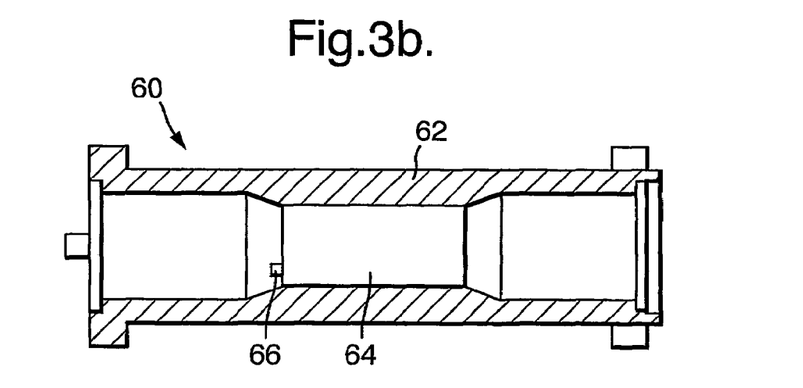

FIGS. 3a and 3b shows a brake pin 60 in accordance with a third embodiment. The brake pin 60 includes a displacement measurement system and is designed to be used in a load measuring system otherwise identical to the second embodiment. The main difference between the brake pin 60 of this third embodiment and that of the second embodiment is that the brake pin 60 in this case is made from a brake pin casing 62 and a separately manufactured displacement measurement system in the form of a cartridge 64, the two separate parts being assembled to form the brake pin 60. The displacement measurement system cartridge 64 comprises a low-stiffness cartridge inside which there are mounted a laser, and CCD. The separation of the laser and CCD is similar to that shown in FIG. 2a and as such the laser and CCD are closer to the ends of the cartridge 64 than the laser and detector of FIG. 2a are to the ends of the brake pin. The cartridge 64 is filled with nitrogen gas and sealed. Electrical connections to the laser and the CCD array are provided by a connector 66 on the outside of the cartridge 64. During assembly of the brake pin, the cartridge 64 is inserted into and mounted within a standard brake pin casing 62 (either as an interference fit or by means of an adhesive or other bonding means). The function of the displacement measurement system is identical to that of the displacement measurement systems described above in relation to the first and second embodiments. As one end of the pin 60 moves relative to the other end, movement of the laser relative to CCD array is caused by means of the mechanical connection of the cartridge 64 to the brake pin casing 62, the cartridge 64 being flexible enough both to allow such movement and to not modify significantly the mechanical properties of the brake pin 60. The main advantage of this embodiment is that standard brake pin casings may be used.

It will be appreciated that various modifications may be made to the above-described embodiments of the invention without departing from the spirit of the invention.

The load measuring system could be used to monitor loads on other aircraft components. For example, trust loads, vertical tail-assembly loads, control surfaces loads, high lift devices loads, may each be monitored by means of a displacement measurement system 4 of the invention.

The apparatus could alternatively be used to monitor the loading and movement of other load bearing structures in other application relating to for example aerospace, civil engineering, automotive, or naval applications. The source and sensors would of course need to be modified to be suitable for such applications so that appropriate ranges of measurement at appropriate resolutions could be made. Such modifications would mainly consist simply of scaling the size of the components up or down as appropriate and would require only routine work to be conducted by the notional person skilled in the art.

The solid-state detectors mentioned above are stated to be able to detect displacements of ±1,000 microns from the normal (central position) with a resolution of about 5 microns. Of course, the range and resolution of the measurements able to be made by the measurement system will depend on the application and on the arrangement, location and separation of the light source and the detectors of the system. For example, when measuring loads on a landing gear leg the deflections are relative large and so a wide range of measurement is required. However, when monitoring the loads on a wheel axle in the region of constant shear, the absolute displacements to be measured are relatively small and a relatively higher resolution of measurement of change in position will be required.

Above reference is made to the control of the braking force applied by means of a feedback loop, wherein when the measured load exceeds a pre-set threshold, the braking force is reduced. The amount by which the braking force is reduced could be a pre-set amount, or could be related to the amount by which the measured load exceeds the threshold. Other criteria could be used to assess how and when to reduce the braking force. For example, the braking force could be reduced as quickly as possible (possibly to zero) for a pre-set time, after which the braking force is reapplied.

The incident light beam or spot image could be generated via light sources other than a laser. For example a one or more LEDs (light emitting diode) could be used. Similarly, the sensor arrangement of the detector may be in the form of any suitable arrangement including, for example, multi-element photodiodes other than quad-cell arrangements (for example having 2, 3, 5, or more diodes), position-sensing photodiodes, or other suitable solid-state detector devices.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not delimit the scope of the independent claims.

The invention claimed is:

1. An aircraft including an apparatus for measuring a load on an aircraft component, the apparatus including a processing unit, a watertight housing, a controllable source of light, and a detector able to detect light emitted from said source, wherein
   the source and the detector are situated in the watertight housing and are thereby situated in a region that is protected from the environment to the exterior of the aircraft,
   the apparatus is arranged so that, when the aircraft component is subjected to a load of the type to be measured, relative movement of the detector and the position of the light from the source in the region of the detector is caused,
   the detector in use generates in response to light received from the source a signal that is received by the processing unit, the signal being dependent on the relative positions of the detector and the light from the source in the region of the detector, and
   the processing unit is arranged to provide an output signal dependent on the load sustained by the aircraft component.

2. An aircraft according to claim 1, wherein the detector and the source are so arranged that, when the aircraft component is subjected to a load of the type to be measured, relative movement of the detector and the source is caused, whereby the signal that is generated by the detector in response to light received from the source is dependent on the relative positions of the source and detector.

3. An aircraft according to claim 1, wherein the housing is a container that contains a gas that has a relative humidity of less than 5%.

4. An aircraft according to claim 3 wherein the light travels through the gas within the housing.

5. An aircraft according to claim 1, wherein the detector comprises a plurality of spaced apart sensors, which in use generate in response to light received from said source a signal or signals that in use are received by the processing unit, which signal or signals being dependent on the relative positions of the sensors and the light from the source in the region of the sensors.

6. An aircraft according to claim 5, wherein the apparatus is so arranged that the signal generated by the detector in dependence on the relative positions of the sensors and the light from the source in the region of the sensors depends on the relative levels of intensity of light received by the sensors.

7. An aircraft according to claim 5, wherein the controllable source emits a focused beam of light and each sensor produces a signal that is dependent on the area of each sensor within the beam of light.

8. An aircraft according to claim 1, wherein the plurality of spaced apart sensors comprises a pair of sensors and the apparatus is so arranged that the signals from the pair of sensors are used to produce a signal representative of the position of the detector relative to the position of the light from the source in the region of the detector, in a single given direction.

9. An aircraft according to claim 1, wherein the signal generated by the detector in use in response to light received from the source is representative of a relative position of the detector and the light from the source in the region of the detector having two degrees of freedom.

10. An aircraft according to claim 1, wherein the apparatus includes a pair of detectors arranged to enable a torsional force sustained by the component to be measured.

11. An aircraft according to claim 1, wherein the apparatus is arranged to provide an output that is representative of the load sustained by the component.

12. An aircraft according to claim 1, wherein the aircraft component is a landing gear or a part thereof.

13. An aircraft according to claim 1 further including a load control system, wherein the load control system is arranged to monitor a measurement of the load sustained by the aircraft component, the measurement being ascertained from the output signal from the processing unit, and to control a part of the aircraft in dependence on the measurements so monitored.

14. An aircraft according to claim 13, wherein the load control system is a braking control system and the aircraft component is an aircraft landing gear or a part thereof, wherein the braking control system is arranged to control the braking in dependence on the loads monitored by the braking control system.

15. An aircraft according to claim 1 wherein the processing unit is arranged to provide an output signal dependent on the current load sustained by the aircraft component.

16. An apparatus for measuring a load on an aircraft component, the apparatus including a controllable source of light, and a detector able to detect light emitted from said source, wherein
the source and the detector are situated in a watertight housing that defines a protected region,
the apparatus is arranged so that, when the housing is subjected to a load of the type to be measured, relative movement of the detector and the position of the light from the source in the region of the detector is caused, and
the detector in use generates in response to light received from the source a signal that depends on the relative positions of the detector and the light from the source in the region of the detector, the signal being suitable for conversion into an output signal that depends on the load sustained by the aircraft component.

17. A method of measuring a load on an aircraft component, the method including the following steps:
causing light to be emitted from a source,
measuring the light received by a detector from the source, the light measurement being dependent on the relative movement of the detector and the position of the light from the source in the region of the detector caused by a load on the aircraft component,
protecting the source and the detector from moisture in the environment to the exterior of the aircraft, and
calculating an indication of the load sustained by the aircraft component from the light measurement together with data concerning the relationship between the light measurement and the load sustained by the component.

18. A method according to claim 17, when performed as part of a method of controlling the loads sustained by an aircraft component including monitoring the loads sustained by the aircraft component the method further including a step of controlling a part of the aircraft in dependence on the results of the monitoring of the loads.

19. A method according to claim 18, when performed as part of a method of maneuvering an aircraft on the ground, the method further including a step of controlling the loads sustained by the aircraft during maneuvers by means of monitoring the loads on the leg of the landing gear of the aircraft and controlling the braking and/or steering of the aircraft in dependence on the loads so monitored.

20. The method of claim 17 wherein calculating an indication of the load sustained by the aircraft component is performed in real time to reflect the current load experienced by the component.

21. The method of claim 17 wherein protecting the source and the detector from moisture in the environment to the exterior of the aircraft further includes placing the detector and source in a housing containing a gas with a relative humidity of less than 10 percent.

22. A method of measuring a load on an aircraft component of an aircraft, the method including the steps of
providing an apparatus for measuring the load, the apparatus including
a processing unit,
a watertight housing,
a controllable source of light, and
a detector able to detect light emitted from said source, the source and the detector being situated in the watertight housing, the source emitting light, the detector receiving light from the source,
subjecting the aircraft component to a load of the type to be measured,
measuring relative movement of the detector and the position of the light from the source in the region of the detector,
generating a signal from the detector in response to light received from the source, the signal being dependent on the relative positions of the detector and the light from the source in the region of the detector,
receiving said signal by the processing unit, and
providing an output signal by the processing unit, said output signal dependent on the load sustained by the aircraft component.

23. An aircraft including an apparatus for measuring a load on an aircraft component, the apparatus including a processing unit, a housing, a controllable source of light, and a detector able to detect light emitted from said source, wherein
the source of light and the detector are situated in the housing and are thereby situated in a region that is protected from the environment to the exterior of the aircraft,
the source of light includes a lens to focus the light through a gas to a detector, the apparatus is arranged so that, when the aircraft component is subjected to a load of the type to be measured, relative movement of the detector and the position of the light from the source in the region of the detector is caused,
the detector in use generates in response to light received from the source a signal that is received by the processing unit, the signal being dependent on the relative positions of the detector and the light from the source in the region of the detector, and
the processing unit is arranged to provide an output signal dependent on the load sustained by the aircraft component.

* * * * *

UNITED STATES PATENT AND TRADEMARK OFFICE
CERTIFICATE OF CORRECTION

PATENT NO. : 7,578,199 B2 Page 1 of 1
APPLICATION NO. : 10/569699
DATED : August 25, 2009
INVENTOR(S) : Alessandro Riccardo Britannico Giazotto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 223 days.

Signed and Sealed this

Seventh Day of September, 2010

David J. Kappos
*Director of the United States Patent and Trademark Office*